US008488006B2

(12) United States Patent
Miyazaki

(10) Patent No.: US 8,488,006 B2
(45) Date of Patent: Jul. 16, 2013

(54) IMAGING APPARATUS CAPABLE OF DETECTING MOTION AMOUNT OF AN OBJECT AND CONTROL METHOD THEREOF

(75) Inventor: Yasuyoshi Miyazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 558 days.

(21) Appl. No.: 12/354,776

(22) Filed: Jan. 16, 2009

(65) Prior Publication Data

US 2009/0179994 A1    Jul. 16, 2009

(30) Foreign Application Priority Data

Jan. 16, 2008    (JP) ................................. 2008-006929

(51) Int. Cl.
*H04N 5/118*    (2006.01)
*H04N 5/235*    (2006.01)

(52) U.S. Cl.
USPC ..................... 348/208.3; 348/221.1; 348/362; 396/52

(58) Field of Classification Search
USPC ........... 348/231.99, 135, 208.1, 208.6, 208.5, 348/208.3, 208.4, 221.1, 362; 725/105
See application file for complete search history.

(56) References Cited

U.S. PATENT DOCUMENTS

| 5,053,875 A * | 10/1991 | Ishii et al. ................ 348/208.99 |
| 5,455,685 A * | 10/1995 | Mori ............................ 348/363 |
| 5,666,159 A * | 9/1997 | Parulski et al. ............. 348/211.2 |
| 5,701,258 A * | 12/1997 | Harris et al. ................. 340/7.53 |
| 5,825,432 A * | 10/1998 | Yonezawa ..................... 348/563 |
| 6,385,398 B1 * | 5/2002 | Matsumoto ..................... 396/52 |
| 6,487,369 B1 * | 11/2002 | Sato ............................ 396/52 |
| 6,535,243 B1 * | 3/2003 | Tullis ......................... 348/207.1 |
| 6,784,924 B2 * | 8/2004 | Ward et al. .................. 348/207.1 |
| 7,173,651 B1 * | 2/2007 | Knowles ..................... 348/207.1 |
| 7,502,050 B2 * | 3/2009 | Hatanaka et al. ............ 348/208.3 |
| 2002/0030745 A1 * | 3/2002 | Squilla et al. ................. 348/207 |
| 2003/0011684 A1 * | 1/2003 | Narayanaswami et al. .................. 348/207.99 |
| 2003/0071908 A1 | 4/2003 | Sannoh et al. |

(Continued)

FOREIGN PATENT DOCUMENTS

| JP | 2001-042379 A | 2/2001 |
| JP | 2003-107567 | 4/2003 |

(Continued)

*Primary Examiner* — Hung Lam
(74) *Attorney, Agent, or Firm* — Canon USA Inc IP Division

(57) ABSTRACT

An imaging apparatus includes an imaging unit configured to capture an image of an object to acquire image data; a display unit configured to display the image captured by the imaging unit; a motion detection unit configured to detect information about motion of the object and the background in a display image based on image data acquired by the imaging unit; a determination unit configured to determine whether the imaging apparatus is taking a panning shot from a result detected by the motion detection unit; and an exposure control unit configured to execute exposure control to decrease the amount of motion of the object and the background in the display image based on a result detected by the motion detection unit, wherein the exposure control unit executes exposure control based on a result detected by the motion detection unit when the imaging apparatus is determined not to be taking a panning shot by the determination unit and, when the imaging apparatus is determined to be taking a panning shot by the determination unit, executes different exposure control compared to a case when the imaging apparatus is determined not to be taking a panning shot.

13 Claims, 5 Drawing Sheets

U.S. PATENT DOCUMENTS

| | | | |
|---|---|---|---|
| 2007/0147814 A1* | 6/2007 | Nomura et al. | 396/55 |
| 2007/0206941 A1* | 9/2007 | Maruyama et al. | 396/153 |
| 2008/0044170 A1* | 2/2008 | Yap et al. | 396/52 |
| 2008/0094498 A1* | 4/2008 | Mori | 348/352 |
| 2009/0128647 A1* | 5/2009 | Fahn et al. | 348/221.1 |
| 2009/0154910 A1* | 6/2009 | Weinberg et al. | 396/50 |
| 2010/0231748 A1* | 9/2010 | Takeda | 348/229.1 |
| 2012/0148224 A1* | 6/2012 | Pozniansky et al. | 396/153 |

FOREIGN PATENT DOCUMENTS

| | | |
|---|---|---|
| JP | 2005-176050 A | 6/2005 |
| JP | 2007-096828 A | 4/2007 |
| JP | 2007-243250 | 9/2007 |
| JP | 2007-243250 A | 9/2007 |

* cited by examiner

DETECTION OF MOTION

DETECTION OF MOTION

NO OBJECT SHAKE

NO MOVING BLUR OF BACKGROUND

IMAGING APPARATUS CAPABLE OF DETECTING MOTION AMOUNT OF AN OBJECT AND CONTROL METHOD THEREOF

BACKGROUND OF THE INVENTION

1. Field of the Invention

The present invention relates to an imaging apparatus and its control method, and more particularly an imaging apparatus capable of detecting the amount of motion of an object.

2. Description of the Related Art

Conventionally, there is an imaging apparatus which detects an object area based on image data obtained by capturing an image, executes exposure control so as to provide a detected area with correct exposure, and executes focus control so as to bring the detected area into focus. Such an imaging apparatus is discussed in Japanese Patent Application Laid-Open No. 2003-107567.

Further, there is an imaging apparatus which detects information about the motion of an object in order to control object shake and adjusts an exposure control value in response to information about the detected motion. For example, in an imaging apparatus discussed in Japanese Patent Application Laid-Open No. 2007-243250, object shake is controlled by executing control so as to set a fast shutter speed when an object is in motion and a slow shutter speed when an object is not in motion, by viewing the amount of motion of the whole screen.

However, the imaging apparatus discussed in Japanese Patent Application Laid-Open No. 2007-243250 has a drawback. A suitable image can be shot with the imaging apparatus according to Patent Application No. 2007-243250 when the background of the image which a user intends to shoot stands still. However, an intended image cannot be shot when a user intends to capture an image in which the background is streaming or blurred but a moving object is in focus (in what is called a panning shot, using the panning technique where the camera follows the moving object at the same approximate speed that the object is moving at) since the stream or blurring of the background is also stopped.

FIGS. 3A and 3B are diagrams illustrating the drawbacks when exposure control, which controls an object shake using motion detection, is executed.

For example, in the imaging apparatus discussed in Japanese Patent Application Laid-Open No. 2007-243250, when motion is detected, as shown in FIG. 3A, with respect to an image of a moving object, the imaging apparatus can make a person stand still.

However, as shown in FIG. 3B, when a person is moving and it desired to get a shot showing the person in focus but with a blurred background (i.e. a panning shot), even though the user desires to shoot an image with a blurred background, exposure control is executed so that the background does not blur.

SUMMARY OF THE INVENTION

The present invention is directed to an imaging apparatus which acquires information about motion, determines whether an imaging apparatus is taking a panning shot, and changes exposure control according to a determined result, thereby allowing a user to perform their intended shot.

An imaging apparatus includes an imaging unit configured to capture an image comprising an object and its background, a motion detection unit configured to detect information about motion of the object and the background of the image based on image data acquired by the imaging unit, a determination unit configured to determine whether the imaging apparatus is being used to take a panning shot, and an exposure control unit configured to execute exposure control such that, when the determination unit determines that the imaging apparatus is not being used to take a panning shot, the exposure control unit executes a first exposure control, based on a result detected by the motion detection unit, to decrease the amount of motion of the object and the background in the image, and when the determining unit determines that the imaging apparatus is being used to take a panning shot, the exposure control unit executes a second exposure control different to the first exposure control.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

In the present exemplary embodiment, a still camera and in particular a digital still camera is used as an imaging apparatus.

Figure 1:
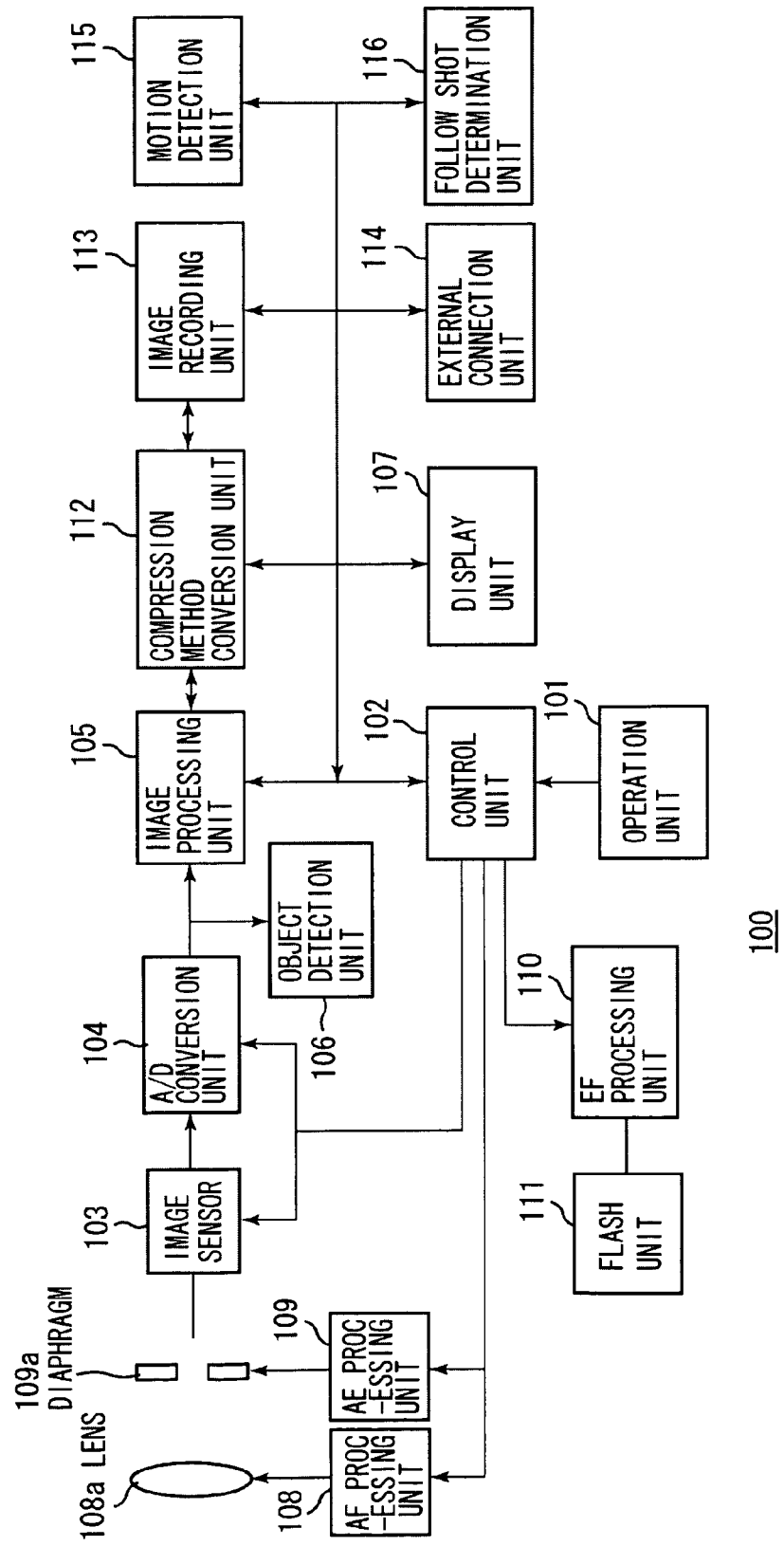
FIG. 1 is a block diagram illustrating a functional configuration of an imaging apparatus according to a first exemplary embodiment of the present invention.

FIG. 1 is a block diagram illustrating a functional configuration of an imaging apparatus 100 according to the present exemplary embodiment.

An operation unit 101 includes switches, buttons and the like which enable an operator of the imaging apparatus 100 to input various kinds of instructions to the imaging apparatus 100.

A control unit 102 is configured to control operation of each unit shown in FIG. 1 and in particular to control each unit in response to instructions from the operation unit 101.

A shutter switch is also contained in the operation unit 101. When this shutter switch is half pressed, a signal SW1 (not shown) is transmitted from the operation unit 101 to the control unit 102.

Further, when the shutter switch is fully pressed, a signal SW2 (not shown) is transmitted from the operation unit 101 to the control unit 102.

An image sensor 103 is a sensor such as a charge-coupled device (CCD) sensor or a complementary metal-oxide semiconductor (CMOS) sensor with a photoelectric conversion function. The image sensor 103 receives incident light via a lens 108a and a diaphragm 109a and outputs an electric charge corresponding to its light quantity. An autofocus (AF) processing unit 108 operates the lens 108a to focus on an object. An automatic exposure (AE) processing unit 109 controls the diaphragm 109a to capture an image with a correct exposure.

An A/D conversion unit 104 executes sampling, gain adjustment, A/D conversion or the like to an analog image signal outputted from the image sensor 103, to output a resulting signal as a digital image signal.

An image processing unit 105 executes various kinds of image processing to the digital image signal outputted from the A/D conversion unit 104 to output the processed digital image signal. For example, the image processing unit 105 converts a digital image signal received from the A/D conversion unit 104 into a YUV image signal and outputs a converted signal.

An object detection unit 106 detects an object area from a digital image signal received from the A/D conversion unit 104 to notify information about the object area to the control unit 102. Information to be acquired by this object detection unit includes information about the position of an object and information about reliability (a degree of certainty of an object shape) in a captured image.

Further, a motion detection unit 115 determines whether motion of a background and an object is present in an image displayed on a display unit 107, which will be described below. The motion detection unit 115 also calculates information about motion such as position of the imaging apparatus 100 itself using, for example, an angular rate sensor. Furthermore, the motion detection unit 115 can calculate respective information about motion of a background and an object (excluding the background) based on the output from the object detection unit 106.

A panning or "follow shot" determination unit 116 determines whether panning shooting is executed using the above information about the motion of the background, the object (excluding background), and the imaging apparatus 100.

Further, the control unit 102 issues a command to an electronic flash (EF) processing unit 110 to turn flash on when it is determined that flash is required. Upon receipt of the command of flash on, the EF processing unit 110 controls a flash unit 111 to emit flash light.

A display unit 107 includes a liquid crystal screen and displays an image based on the image data processed by the image processing unit 105.

A compression method conversion unit 112 converts a compression method of a digital image signal output from the image processing unit 105, into a compression method such as a Joint Photographic Experts Group (JPEG) and outputs the converted signal to an image recording unit 113.

The image recording unit 113 records a digital image signal converted with a compression method received from the compression method conversion unit 112 on a memory means (not shown) in the imaging apparatus 100, an external memory means to be inserted into the imaging apparatus 100 or the like.

An external connection unit 114 functions as an interface that connects the imaging apparatus 100 to an external device such as a personal computer (PC) or a printer.

Next, operation of the imaging apparatus 100 when an image is captured using the imaging apparatus 100 will be described.

First, when an operator of the imaging apparatus 100 turns on a power source switch contained in the operation unit 101, the control unit 102 detects the switching and power is supplied to each unit constituting the imaging apparatus 100.

When power is supplied from the power source (not shown) to each unit constituting the imaging apparatus 100, a shutter (not shown) is opened and consequently light enters the image sensor 103 via the lens 108a and the diaphragm 109a. Then, the control unit 102 reads an electric charge built up in the image sensor 103 and outputs the read charge to the A/D conversion unit 104 as an analog image signal.

The A/D conversion unit 104 executes sampling, gain adjustment, A/D conversion or the like to the analog image signal output from the image sensor 103 and outputs the converted signal as a digital image signal.

Next, the image processing unit 105 executes various kinds of image processing to the digital image signal output from the A/D conversion unit 104 to output the processed digital image signal.

Next, the object detection unit 106 detects an object area from the captured image that a digital image signal received from the A/D conversion unit 104 represents. Then, the object detection unit 106 notifies information concerning the object area, such as information about the position of the detected object area or reliability, to the control unit 102.

Furthermore, a digital image signal processed by the object detection unit 106 is delivered to the motion detection unit 115 to detect information about motion.

In the present exemplary embodiment, two images that are obtained in a time sequential manner (a current captured image and a previously captured image) are compared, and information about the motion of an object and a background (position, range of motion, amount of motion) is detected from the difference between the two images.

As one method to clip an object and a background, information concerning the object area detected by the object detection unit 106 is used. Further, the above-described information about motion also includes information about other motion such as the amount of motion of the imaging apparatus 100 itself, obtained from an angular rate sensor.

Next, the panning determination unit 116 determines whether the imaging apparatus 100 is taking a panning shot based on the above-described information about motion.

When the panning determination unit 116 determines that the imaging apparatus 100 is not taking a panning shot, an exposure control value for main exposure is changed in response to the amount of motion.

When the panning determination unit 116 determines that the imaging apparatus 100 is taking a panning shot, an exposure control value for main exposure is not changed.

The main exposure herein refers to exposure to be performed after a shutter switch is fully pressed.

Next, the image processing unit 105 executes various kinds of image processing to a digital image signal output from the A/D conversion unit 104 before outputting the processed digital image signal.

Further, the image processing unit 105 outputs the processed digital image signal to the display unit 107 and displays an image based on the processed digital image signal on the display unit 107.

Then, as long as a signal SW1 is not transmitted from the operation unit 101 to the control unit 102 (that is, notification of half press of shutter switch), the above-described processing is repeated.

On the other hand, if the signal SW1 is transmitted from the operation unit 101 to the control unit 102, the image processing unit 105 executes the AF processing and AE processing to an image at that time, and acquires a most suitable in-focus state and an exposure setting condition for shooting.

Then, as long as a signal SW2 is not transmitted from the operation unit 101 to the control unit 102 (that is, notification of full press of shutter switch), the processing before the signal SW1 is repeated.

On the other hand, if the signal SW2 is transmitted from the operation unit 101 to the control unit 102, the control unit 102 determines whether flash light should be emitted.

Whether the flash light is emitted may be determined by reading the data which is set beforehand using the operation unit 101, or may be determined by detecting brightness of the captured image and using the detected brightness.

When the control unit 102 determines emission of the flash light is required, the control unit 102 controls the EF processing unit 110, causes the flash unit 111 to execute pre-light emission, and executes processing such as calculation of the quantity of light emission, or weighting of the flash in the captured image and others.

Then, the control unit 102 causes the flash unit 111 to emit light in the quantity calculated by the pre-light emission. Then, shooting is performed with the flash light.

When the control unit 102 determines emission of the flash light is not required, the processing advances to the following processing without calculating the quantity of light emission as described above.

Since incident light enters the image sensor 103 via the lens 108a and the diaphragm 109a, an electric charge is built up corresponding to the quantity of incident light in a photoelectric conversion element 301 (not shown) constituting the image sensor 103. Then, the image processing unit 105 reads an electric charge built up in the image sensor 103 and outputs the read charge to the A/D conversion unit 104 as an analog image signal.

The A/D conversion unit 104 executes sampling, gain adjustment, A/D conversion or the like to the analog image signal output from the image sensor 103 and outputs the processed signal as a digital image signal.

Next, the image processing unit 105 executes various kinds of image processing on the digital image signal output from the A/D conversion unit 104 and outputs the processed digital image signal.

The compression method conversion unit 112 converts a compression method of the digital image signal output from the image processing unit 105 into a compression method such as a JPEG and outputs the converted signal to the image recording unit 113. The image recording unit 113 records image data converted with a compression method in a predetermined memory.

By the processing described above, it is determined whether the imaging apparatus 100 is taking a panning shot and correct exposure control is executed corresponding to the determined result, thereby allowing a user to obtain the intended shot.

Next, control of determination of a panning shot using motion detection will be described.

Figure 2:
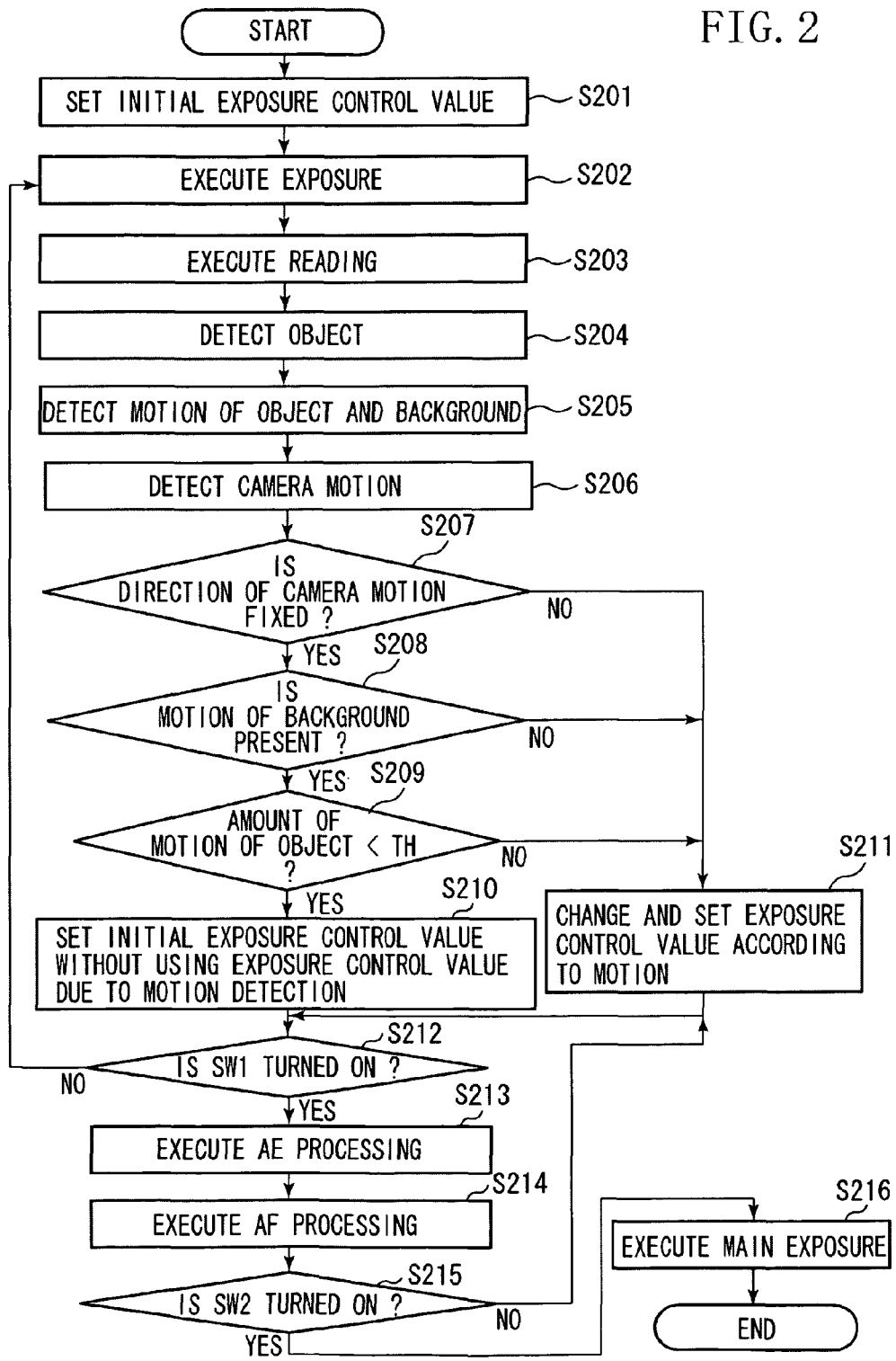
FIG. 2 illustrates a flowchart concerning determination of a panning shot using motion detection according to a first exemplary embodiment of the present invention.
Figure 3A:
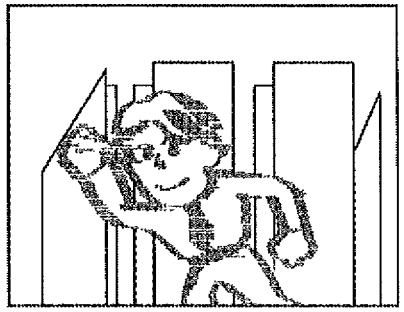
FIGS. 3A and 3B are diagrams illustrating the drawbacks of exposure control that controls an object shake using motion detection.
Figure 3B:
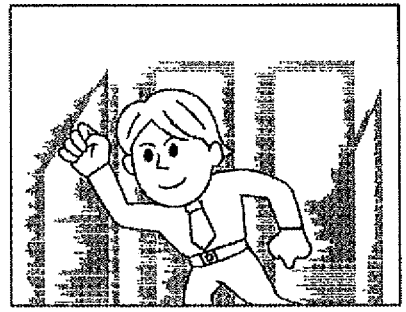
Figure 3B:
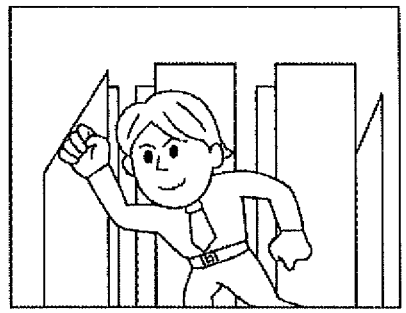
Figure 3B:
Figure 3B:
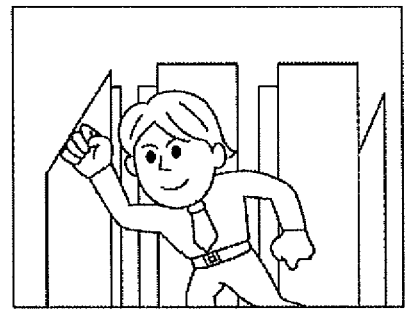
Figure 3B:

FIG. 2 illustrates a flowchart concerning determination of a panning shot using motion detection.

When a power source of the imaging apparatus 100 is turned on and imaging processing is started, the control unit 102 starts the processing from step S201.

In step S201, the control unit 102 acquires a current exposure control value. The exposure control value herein refers to an aperture value, a shutter speed, and a gain value.

In step S202, the control unit 102 executes exposure with the exposure control value acquired in step S201.

In step S203, the control unit 102 reads an image resulting from execution of exposure in step S202, instructs predetermined image processing in the image processing unit 105, and the processed image is displayed on the display unit 107. Thus, a live view function can be realized.

In step S204, the object detection unit 106 detects an object area among images displayed on the display unit 107 in step S203, and acquires information about a position and reliability of the captured image.

In step S205, the motion detection unit 115 compares two images obtained in a time series fashion (a current captured image and an image captured before that) to execute detection of motion. For example, while an image 1 previously detected is held, an image 2 is newly acquired this time. If information about the position of the object area is known by the object detection executed in step S204, any area including the object area is used as a comparison area to obtain a partial difference between the images 1 and 2.

Information about motion of a background and an object area is separately acquired by obtaining a difference of the amount of motion between images, using information about the position of the image area obtained by the object detection unit 106.

In step S206, the motion detection unit 115 acquires information about motion of the imaging apparatus 100 itself from an angular rate sensor.

In step S207, the panning determination unit 116 determines whether a direction of motion of the imaging apparatus 100 itself is constant from information about motion obtained in step S206.

In step S207, when the panning determination unit 116 determines that the direction of motion of the imaging apparatus 100 itself is not constant, it is determined that the imaging apparatus 100 is not taking a panning shot and the processing advances to step S211.

In step S207, when the panning determination unit 116 determines that the direction of motion of the imaging apparatus 100 itself is constant, the processing advances to step S208. In the present exemplary embodiment, the panning determination unit 116 determines whether the direction of motion of the imaging apparatus 100 itself is constant. However, the invention is not limited to the present embodiment. It may also be determined whether a motion of a fixed pattern that characterizes a panning shot is contained in the image. Further, in a case where a photographer takes a panning shot holding the imaging apparatus 100, even when the direction of motion of the imaging apparatus 100 itself is not constant, if a degree of the change can be regarded as constant, it may be determined as a state of panning.

In step s208, the panning determination unit 116 determines whether the motion of a background is present from information about the motion of the background obtained in step S205.

In step S208, if the panning determination unit 116 determines that the background is not moving, it is determined that the imaging apparatus 100 is not taking a panning shot and the processing advances to step S211.

In step S208, if the panning determination unit 116 determines that the motion of a background is present, the processing advances to Step S209.

In step S208, whether the motion of a background is present is determined. However, it is desirable to set up a determination criterion that regards motion as absent when the background is slightly moved.

In step S209, the panning determination unit 116 determines whether the amount of motion of an object is smaller than a predetermined value set beforehand from information about the motion of the object area obtained in step S205.

In step S209, if the panning determination unit 116 determines that the amount of motion of an object is not less than a predetermined value TH set beforehand, it is determined that the imaging apparatus 100 is not taking a panning shot and the processing advances to step S211.

In step S209, if the panning determination unit 116 determines that the amount of motion of an object is smaller than a predetermined value TH set beforehand, the processing advances to step S210.

In step S210, the panning determination unit 116 determines that the imaging apparatus 100 is taking a panning shot and sets the exposure control value acquired in step S201 as an exposure control value. More specifically, when the panning determination unit 116 determines that the current captured image is an image captured using the panning technique, the panning determination unit 116 does not set an exposure control value that suppresses an object shake based on a result of the motion detection.

In step S211, the panning determination unit 116 determines that the imaging apparatus 100 is not taking a panning shot and sets an exposure control value based on information about the motion detected by the motion detection unit 115. In other words, when the panning determination unit 116 determines that the imaging apparatus 100 is not taking a panning shot, the panning determination unit 116 sets an exposure control value that suppresses an object shake based on a result detected by the motion detection unit 115. More specifically, for example, in order to reduce the amount of motion of an object and of a background, the larger the amount of motion of an object or a background becomes, the faster the control unit 102 sets a shutter speed. The exposure control value to be set on the basis of a result detected by the motion detection unit 115 in order to control an object shake is not limited to a shutter speed. An exposure control value such as an aperture value or a gain value may also be employed in order to control an object shake.

In step S212, the control unit 102 determines whether a signal SW1 is transmitted from the operation unit 101 to the control unit 102.

In step S212, if the signal SW1 is transmitted from the operation unit 101 to the control unit 102, the processing advances to step S213.

In step S212, if the signal SW1 is not transmitted from the operation unit 101 to the control unit 102, the processing from step S202 is repeated.

In step S213, the AE processing unit 109 executes AE control so as to select a suitable exposure for the detected object based on information about the object detected by the object detection unit 106.

In step S214, the AF processing unit 108 executes AF control so as to select a suitable focus state for the detected object based on information about the object detected by the object detection unit 106. When a plurality of objects is detected as a result of object detection, the above-described AE and AF control may be executed so as to make all objects suitable, or AE and AF control may be executed by weighting each object.

In step S215, the control unit 102 determines whether a signal SW2 is transmitted from the operation unit 101 to the control unit 102.

In step S215, if the signal SW2 is transmitted from the operation unit 101 to the control unit 102 within predetermined time after AF control has been executed in step S214, the processing advances to step S216.

In step S215, if the signal SW2 is not transmitted from the operation unit 101 to the control unit 102 within predetermined time after AF control has been executed in step S214, the processing returns to step S212.

Here, in step S214, the processing is changed according to the elapsed time after AF control has been executed until the SW2 is transmitted from the operation unit 101 to the control unit 102 for a following reason.

When transition to the state of the SW2 is not carried out within a certain time after AF control has been executed, it is considered that the scene may have changed. Thus, it is possible that suitable shooting can be performed if the processing in steps S213 and S214 is repeated.

In step S216, the control unit 102 executes main exposure with an AE control value and an AF control value determined in steps S213 and S214, and the processing ends.

It is noted that in the present exemplary embodiment, whether the imaging apparatus 100 is taking a panning shot is determined by a direction of the motion of an imaging apparatus, presence or absence of the motion of a background, and the amount of the motion of an object but it is not always necessary to make a determination based on all of these conditions.

If at least a relation between the presence or absence of the motion of a background, and the amount of the motion of an object is obtained, it can be determined whether the imaging apparatus 100 is taking a panning shot. Accordingly, an angular rate sensor for obtaining information about motion of the imaging apparatus 100 itself is not necessarily required.

As described above, shooting intended by a user can be performed by determining whether the imaging apparatus 100 is taking a panning shot and executing exposure control based on the determined result.

A second exemplary embodiment of the present invention will be described below. A description of the elements of an imaging apparatus similar to the first exemplary embodiment will be omitted.

In the first exemplary embodiment, the panning determination unit 116 is provided to determine whether the imaging apparatus 100 is taking a panning shot. The present exemplary embodiment is different from the first exemplary embodiment in that an imaging apparatus includes a panning mode and determines whether a panning mode is set.

Figure 4:
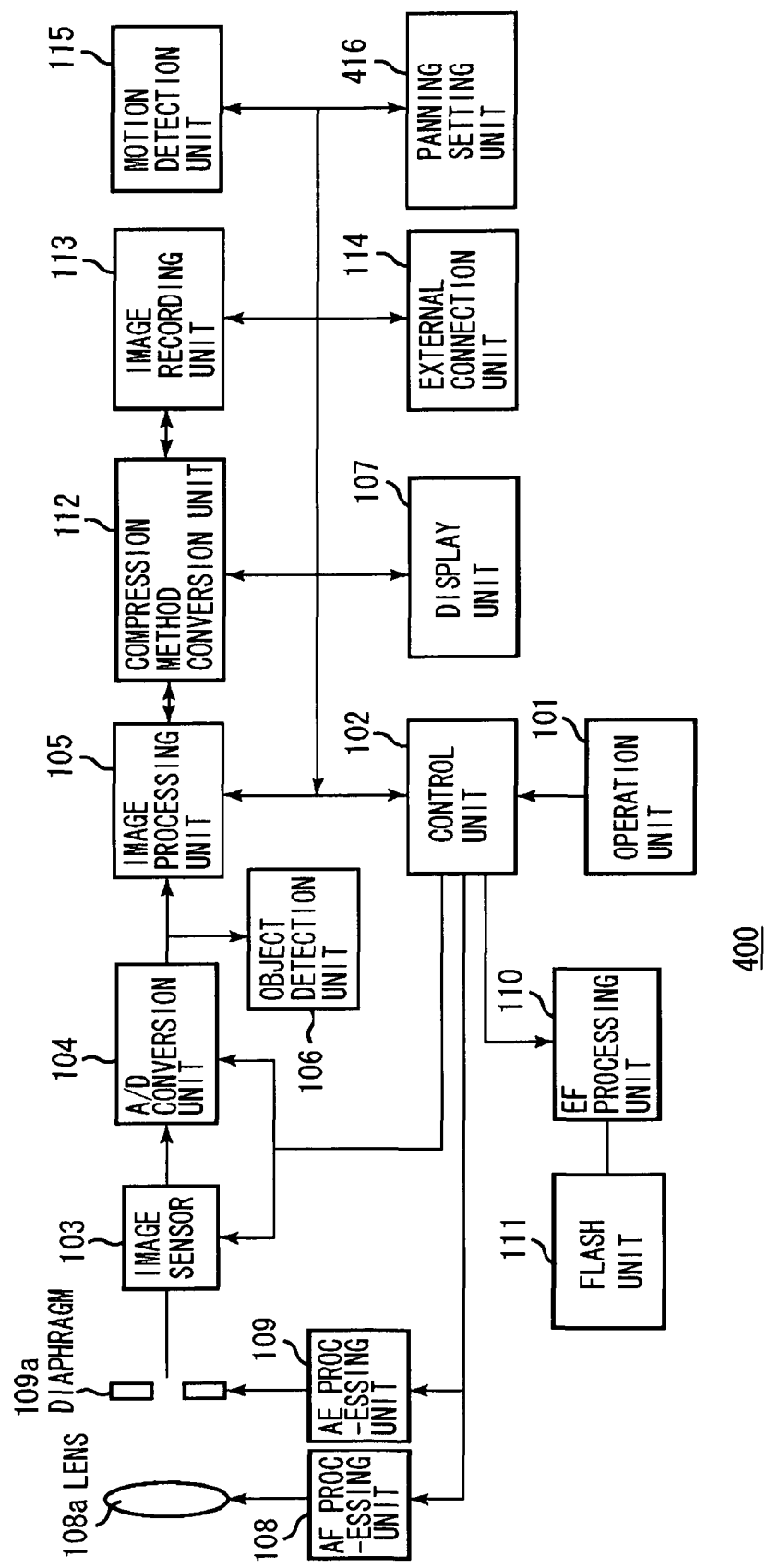
FIG. 4 is a block diagram illustrating a functional configuration of an imaging apparatus according to a second exemplary embodiment of the present invention.

FIG. 4 is a block diagram illustrating a functional configuration of an imaging apparatus 400 according to the present exemplary embodiment. The imaging apparatus 400 is different from the imaging apparatus 100 according to the first exemplary embodiment only in that a panning setting unit 416 is provided.

A panning setting unit 416 sets a panning mode, which is a shooting mode for a panning shot. The panning mode refers to a shooting mode in which an exposure control value is controlled so that a captured image shows an blurred image. In this mode, a shutter speed is set slow, a diaphragm is narrowed, or gain is reduced.

In the present exemplary embodiment, when a panning mode is set, exposure control by motion detection which impairs a panning shot is prevented. Therefore, a correction of camera shake is suppressed and an amount of correction is smaller than that when a panning shot is not being taken.

When a panning shot is taken, an imaging apparatus is moving along with an object, therefore, camera shake easily occurs. Accordingly, by performing camera shake correction control, the influence of camera shake is reduced and more suitable shooting becomes possible.

Further, as a result of motion detection, when it is determined that a scene has motion, if exposure control is performed such that a shutter speed is set fast, a diaphragm is opened and a gain is increased to eliminate the influence of motion. Consequently the desired effect of a panning shot, namely that an object is in focus whilst the background is blurred, cannot be obtained.

Accordingly, in the present exemplary embodiment, when a panning mode is set, even if motion of a scene is detected by motion detection, exposure control, such as setting a fast shutter speed, opening a diaphragm and increasing gain, is not performed.

Next, control of determination of a panning shot using mode detection will be described.

Figure 5:
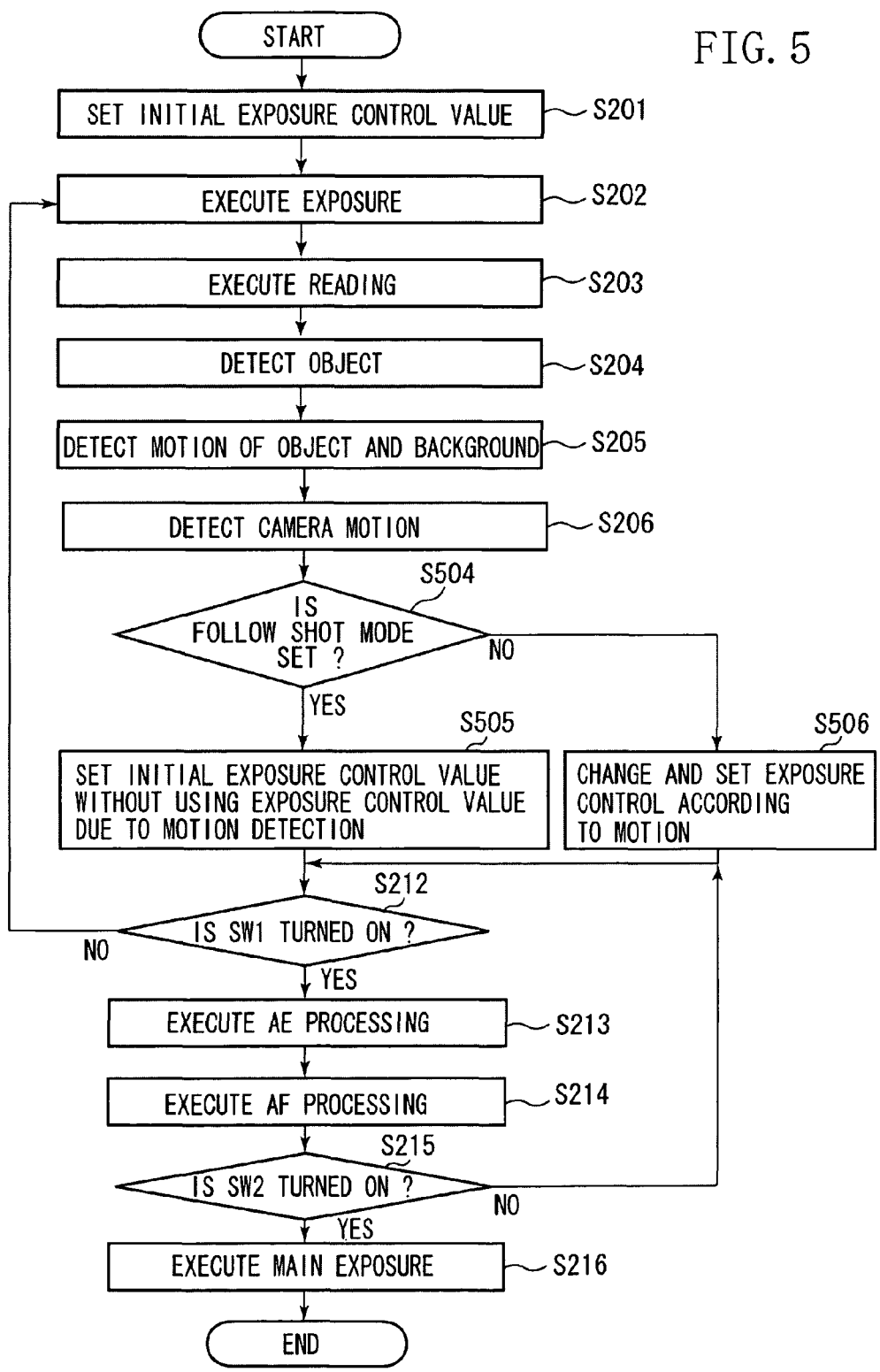
FIG. 5 illustrates a flowchart concerning determination of a panning shot using motion detection according to a second exemplary embodiment of the present invention.

FIG. 5 illustrates a flowchart concerning determination of a panning shot using mode detection. In this flowchart, a difference from the first exemplary embodiment is the processing in steps S504 to S506. Thus, these processing will be described.

In step S504, the control unit 102 determines whether a shooting mode currently set in the imaging apparatus 400 is a panning or "follow shot" mode.

In step S504, if the control unit 102 determines that the shooting mode currently set in imaging apparatus 400 is a panning mode, the processing advances to step S505. In step S505, the control unit 102 sets the exposure control value acquired in step S201 as an exposure control value. More specifically, if the control unit 102 determines that the shooting mode currently set in imaging apparatus 400 is a panning mode, setting of an exposure control value that suppresses an object shake based on a result of motion detection, is not made.

In step S504, if the control unit 102 determines that the shooting mode currently set in imaging apparatus 400 is not a panning mode, the processing advances to step S506. In step S506, the control unit 102 sets an exposure control value based on information about motion detected by the motion detection unit 115. More specifically, if the panning determination unit 116 determines that the shooting mode currently set in the imaging apparatus 400 is not a panning mode, the control unit 102 sets an exposure control value that suppresses an object shake based on a result of motion detection.

In the present exemplary embodiment, an imaging mode setting method may be set by a user by operating a mode dial (not shown) or set by selecting a panning mode from a menu screen.

As described above, shooting intended by a user can be performed by determining whether a panning mode is set and executing exposure control according to a determined result with an imaging apparatus including a panning mode.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-006929 filed Jan. 16, 2008, which is hereby incorporated by reference herein in its entirety.

What is claimed is:

1. An imaging apparatus comprising:
an imaging unit configured to capture an image comprising an object and its background;
a motion detection unit configured to detect information about motion of the object and the background of the image based on image data acquired by the imaging unit;
a determination unit configured to determine whether the imaging apparatus is being used to take a panning shot; and
an exposure control unit configured to execute exposure control such that, when the determination unit determines that the imaging apparatus is not being used to take a panning shot and the amount of motion of an object is not less than a predetermined value, the exposure control unit executes a first exposure control to suppress the motion of the object in the image, based on a result detected by the motion detection unit, and when the determining unit determines that the imaging apparatus is being used to take a panning shot, the exposure control unit executes a second exposure control different to the first exposure control,
wherein the exposure control unit does not set an exposure control value of main exposure in the second exposure control, based on a result detected by the motion detection unit.

2. The imaging apparatus according to claim 1, wherein the determination unit is configured to determine whether the imaging apparatus is being used to take a panning shot based on the result detected by the motion detection unit.

3. The imaging apparatus according to claim 1, further comprising a display unit configured to display the image captured by the imaging unit.

4. The imaging apparatus according to claim 1, wherein the motion detection unit is configured to detect information about the motion of the imaging apparatus, and
wherein the determination unit is configured to determine whether the imaging apparatus is being used to take a panning shot based on information about motion of the object and the background of the image and information about the motion the imaging apparatus.

5. The imaging apparatus according to claim 1, wherein the exposure control unit sets at least one of a shutter speed, an aperture value, and a gain value of main exposure in the first exposure control, based on a result detected by the motion detection unit.

6. The imaging apparatus according to claim 1, wherein the exposure control unit is configured to set a faster shutter speed as the amount of motion of the object or the background increases in the first exposure control.

7. The imaging apparatus according to claim 1, further comprising:
a shake correction unit configured to execute correction of blurring of the image due to shake of the imaging apparatus, wherein the shake correction unit performs imaging apparatus shake correction with a reduced amount of correction when the imaging apparatus is determined to be taking a panning shot by the determination unit, compared with a correction amount when the imaging apparatus is determined not to be taking a panning shot.

8. The imaging apparatus according to claim 1, wherein the determination unit is configured to determine that the imaging apparatus is taking a panning shot when the background of the image is moving and the amount of motion of the object of the image is smaller than a predetermined value.

9. The imaging apparatus according to claim 1, wherein the determination unit is configured to determine that the imaging apparatus is taking a panning shot when the background of the image is moving, the amount of motion of the object of the image is smaller than a predetermined value set beforehand and a direction of motion of the imaging apparatus is constant.

10. An imaging apparatus according to claim 1 further comprising:
an imaging mode setting unit configured to set a shooting mode from a plurality of shooting modes including a first imaging mode and a second panning mode; and wherein the determination unit is configured to determine whether the first imaging mode has been set and the imaging apparatus is not being used to take a panning shot or whether the second panning mode has been set and the imaging apparatus is being used to take a panning shot.

11. A method for controlling an imaging apparatus including an imaging unit configured to capture an image comprising an object and a background, the method comprising the steps of:
- detecting information about motion of the object and the background in the image, based on image data acquired by the imaging unit;
- determining whether the imaging apparatus is being used to take a panning shot;
- executing a first exposure control to suppress the motion of the object in the image, based on the detected information about motion of the object and the background in the image, when it is determined that the imaging apparatus is not being used to take a panning shot and the amount of motion of an object is not less than a predetermined value; and
- executing a second exposure control different to the first exposure control when it is determined that the imaging apparatus is being used to take a panning shot, wherein the second exposure control does not set an exposure control value of main exposure based on the detected information about motion of the object and the background in the image.

12. A method for controlling an imaging apparatus according to claim 11 wherein the determining step comprises determining whether the imaging apparatus is taking a panning shot from the detected information about motion of the object and the background in the image.

13. A method for controlling an imaging apparatus according to claim 11 comprising the step of
- setting a shooting mode from a plurality of shooting modes including a first imaging mode and a second panning mode,
- and wherein the determining step comprises determining whether the first imaging mode has been set and the imaging apparatus is not being used to take a panning shot or whether the second panning mode has been set and the imaging apparatus is being used to take a panning shot.

* * * * *